(12) United States Patent
Bhatia et al.

(10) Patent No.: US 11,023,586 B2
(45) Date of Patent: Jun. 1, 2021

(54) AUTO DETECTION MECHANISM OF VULNERABILITIES FOR SECURITY UPDATES

(71) Applicant: American Megatrends International LLC, Duluth, GA (US)

(72) Inventors: Anurag Bhatia, Lilburn, GA (US); Samvinesh Christopher, Suwanee, GA (US); Winston Thangapandian, Suwanee, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 82 days.

(21) Appl. No.: 16/171,541

(22) Filed: Oct. 26, 2018

(65) Prior Publication Data
US 2020/0134184 A1    Apr. 30, 2020

(51) Int. Cl.
| | | |
|---|---|---|
| *G06F 21/57* | (2013.01) | |
| *G06F 11/36* | (2006.01) | |
| *G06F 8/65* | (2018.01) | |
| *G06F 8/71* | (2018.01) | |

(52) U.S. Cl.
CPC .............. *G06F 21/572* (2013.01); *G06F 8/65* (2013.01); *G06F 11/3688* (2013.01); *G06F 21/577* (2013.01); *G06F 8/71* (2013.01); *G06F 2221/033* (2013.01)

(58) Field of Classification Search
CPC ...... G06F 21/572; G06F 8/65; G06F 11/3688; G06F 21/577; G06F 8/71; G06F 2221/033
See application file for complete search history.

(56) References Cited

U.S. PATENT DOCUMENTS

| | | | | |
|---|---|---|---|---|
| 9,069,965 B2 * | 6/2015 | Liles | .................... | G06F 21/572 |
| 9,594,571 B2 * | 3/2017 | Bibb, Jr. | ............... | G06F 21/572 |
| 10,387,672 B1 * | 8/2019 | Harland | ............. | G06F 21/6218 |
| 10,467,439 B2 * | 11/2019 | Khatri | ................... | H04L 9/0643 |
| 10,534,936 B2 * | 1/2020 | Young | .................. | H04L 9/3247 |
| 10,572,242 B1 * | 2/2020 | Santharam | .......... | G06F 11/1004 |
| 10,592,232 B2 * | 3/2020 | Lin | ......................... | G06F 8/654 |
| 10,613,847 B2 * | 4/2020 | Gore | ......................... | G06F 8/65 |
| 10,628,176 B1 * | 4/2020 | Santharam | ............ | G06F 9/4401 |
| 2010/0275263 A1 * | 10/2010 | Bennett | ................ | G06F 21/577 726/25 |
| 2011/0302657 A1 * | 12/2011 | Ikegami | ................ | G06F 21/577 726/25 |

(Continued)

*Primary Examiner* — Joseph P Hirl
*Assistant Examiner* — Stephen T Gundry
(74) *Attorney, Agent, or Firm* — Locke Lord LLP; Tim Tingkang Xia, Esq.

(57) ABSTRACT

In an aspect of the disclosure, a method, a computer-readable medium, and a device are provided. The device the package determination component 430 determines one or more packages distributed in firmware of a BMC. The device determines a respective update of each of the one or more packages. The device determines a first set of security vulnerabilities of the each package that is addressed by the respective update. The device further determines a second set of security vulnerabilities of the each package after the respective update is applied. The device generates a first file indicating the first set of security vulnerabilities and the second set of security vulnerabilities.

17 Claims, 5 Drawing Sheets

(56) References Cited

U.S. PATENT DOCUMENTS

| | | | |
|---|---|---|---|
| 2012/0180133 A1* | 7/2012 | Al-Harbi | H04L 63/1433 |
| | | | 726/25 |
| 2016/0291958 A1* | 10/2016 | Riedisser | G06F 8/71 |
| 2017/0012770 A1* | 1/2017 | Lin | H04L 9/0891 |
| 2017/0104789 A1* | 4/2017 | Cudak | H04L 67/10 |
| 2017/0109531 A1* | 4/2017 | Wang | H04L 9/3234 |
| 2017/0220802 A1* | 8/2017 | Huang | G06F 21/575 |
| 2018/0096154 A1* | 4/2018 | Shivanna | G06F 21/577 |
| 2018/0101376 A1* | 4/2018 | Olarig | H04L 41/082 |
| 2018/0144135 A1* | 5/2018 | Rihan | H04L 63/1458 |
| 2018/0173516 A1* | 6/2018 | Tung | G06F 8/63 |
| 2018/0225109 A1* | 8/2018 | Stewart | G06F 21/51 |
| 2018/0365422 A1* | 12/2018 | Callaghan | H04L 63/0442 |
| 2019/0012490 A1* | 1/2019 | Khatri | H04L 9/3239 |
| 2019/0026125 A1* | 1/2019 | Preimesberger | H04L 67/2804 |
| 2019/0065786 A1* | 2/2019 | Young | G06F 21/57 |
| 2019/0171436 A1* | 6/2019 | Shivanna | G06F 8/65 |
| 2019/0250897 A1* | 8/2019 | Gore | G06F 8/62 |
| 2019/0286825 A1* | 9/2019 | Ponnuru | H04L 63/20 |
| 2019/0370482 A1* | 12/2019 | Harland | G06F 11/0772 |
| 2019/0384918 A1* | 12/2019 | Ndu | G06F 21/577 |
| 2020/0050767 A1* | 2/2020 | Lin | G06F 21/64 |
| 2020/0074086 A1* | 3/2020 | Bulygin | G06F 21/54 |
| 2020/0082090 A1* | 3/2020 | Samuel | G06F 21/575 |
| 2020/0099584 A1* | 3/2020 | Bhattacharyya | H04L 41/0853 |

\* cited by examiner

AUTO DETECTION MECHANISM OF VULNERABILITIES FOR SECURITY UPDATES

BACKGROUND

Field

The present disclosure relates generally to computer systems, and more particularly, to techniques of determining security vulnerabilities of baseboard management controller (BMC) firmware.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

BMC firmware includes multiple packages that may contain security vulnerabilities. There is a need for a mechanism that can determine security vulnerabilities addressed by package updates and remaining open issues.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a device are provided. The device the package determination component 430 determines one or more packages distributed in firmware of a BMC. The device determines a respective update of each of the one or more packages. The device determines a first set of security vulnerabilities of the each package that is addressed by the respective update. The device further determines a second set of security vulnerabilities of the each package after the respective update is applied. The device generates a first file indicating the first set of security vulnerabilities and the second set of security vulnerabilities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
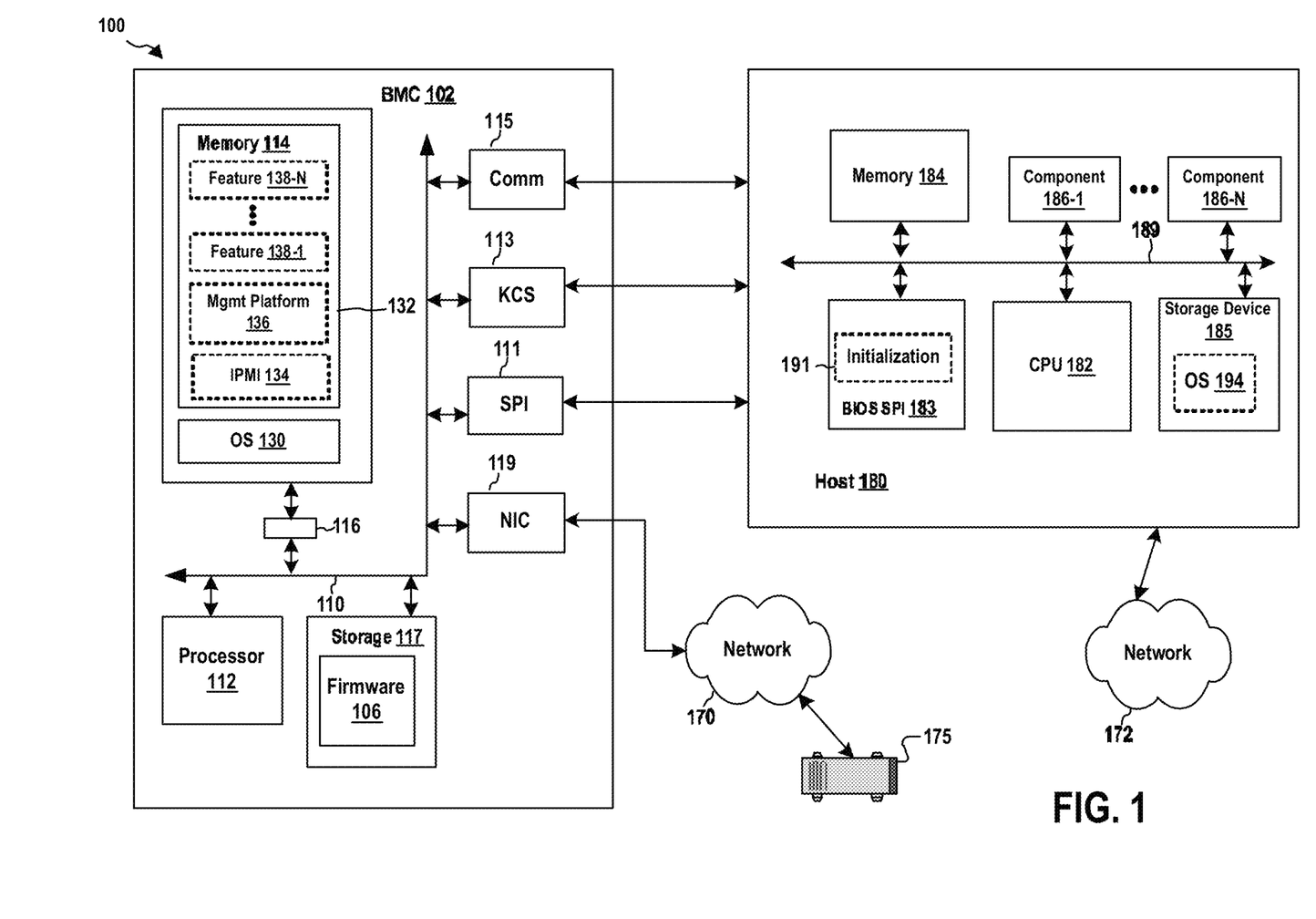
FIG. 1 is a diagram illustrating a computer system.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage 117, a SPI interface 111 (Serial Peripheral Interface), a KCS interface 113 (Keyboard Controller Style), a network interface card 119, and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the KCS interface 113, the SPI interface 111, and/or the communication interfaces 115 may be on the same chip. In addition, those components may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134, a management platform 136, and feature components 138-1 to 138-N. Further, the service components 132 may be implemented as a service stack. As such, the BMC firmware 106 can provide an embedded system to the BMC 102. In addition, the storage 117 may provide database(s) 107 that can be accessed by the IPMI services 134 or the management platform 136.

In one example, the management platform 136 may implements REDFISH specification, as defined in "Redfish Scalable Platforms Management API Specification Document Identifier: DSP0266 Date: 2018 Apr. 5 Version: 1.4.1," which is published by Distributed Management Task Force (DMTF) and is expressly incorporated by reference herein in its entirety.

The BMC 102 may be in communication with the host computer 180 through the KCS interface 113, the network interface card 119, the communication interfaces 115, the SPI interface 111, and/or the IPMI interface.

The host computer 180 includes a host CPU 182, a host memory 184, a storage device 185, an initialization storage device 183, and component devices 186-1 to 186-N that may be interconnected with each other through a host bus system 189. Further, the initialization storage device 183 may be a SPI device.

The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 502 shown in FIG. 5.

In this example, after the host computer 180 is powered on, the host CPU 182 loads an initialization component 191 from the initialization storage device 183 into the host memory 184 and executes the initialization component 191. In one example, the initialization component 191 is a basic input/output system (BIOS). In another example, the initialization component 191 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 191 may include one or more UEFI boot services.

The initialization component 191, among other things, performs hardware initialization during the booting process (power-on startup). For example, when the initialization component 191 is a BIOS, the initialization component 191 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 191 then initializes the device on which it is located. When the initialization component 191 includes UEFI boot services, the initialization component 191 may also perform procedures similar to POST.

After the initialization is performed, the initialization component 191 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Each of the feature components 138-1 to 138-N, alone or in combination with the IPMI services 134 and/or the management platform 136, may provide a particular functionality. The functionality may be for managing the components of the host computer 180. For example, the feature component 138-1 may update the firmware of the initialization storage device 183.

Figure 2:
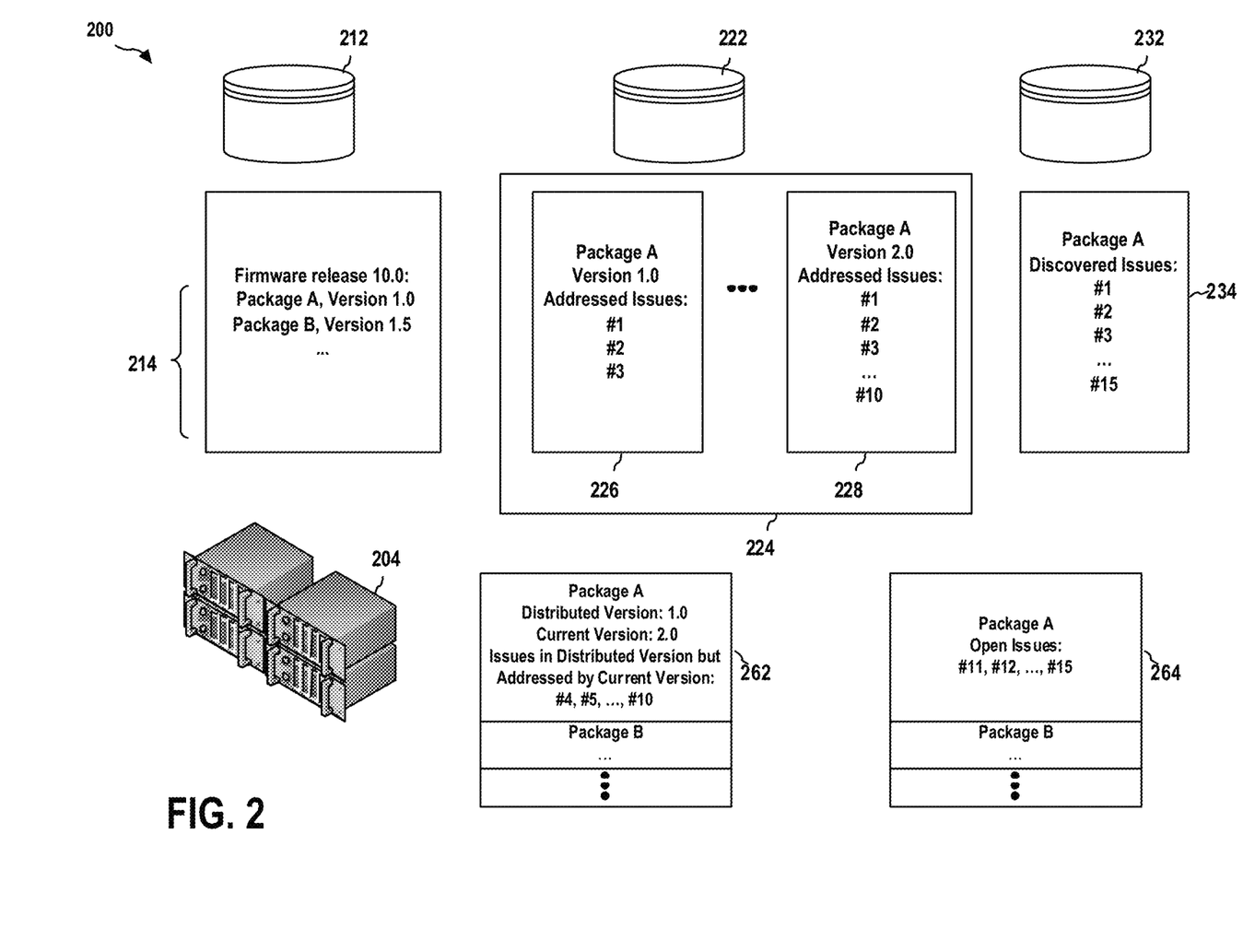
FIG. 2 is a diagram illustrating operations of a security vulnerability analyzer.

FIG. 2 is a diagram 200 illustrating operations of a security vulnerability analyzer 204. The security vulnerability analyzer 204 can analyze a particular release of the BMC firmware 106 to determine security vulnerability of that release. More specifically, the security vulnerability analyzer 204 obtains a release ID of the BMC firmware 106 to be analyzed. Based on the release ID, the security vulnerability analyzer 204 quires a package repository 212 to determine all packages 214 contained in the BMC firmware 106. Each package may provide a particular function or one of the feature components 138-1 to 138-N of the BMC 102. For example, a package A of the BMC firmware 106 may provide a web server function. The package repository 212 contains information of each release of the BMC firmware 106. In particular, the information includes the identity (name) and version of each package included in each release of the BMC firmware 106. As such, the security vulnerability analyzer 204 also obtains the version of each package of the packages 214.

Further, the security vulnerability analyzer 204 quires a package release database 222 to determine security vulnerabilities addressed by the version of a package distributed in the BMC firmware 106 and updates of the package. The package release database 222 contains information of each version of a particular package, including a set of security vulnerabilities addressed by each version and details of each security vulnerability. In this example, the security vulnerability analyzer 204 initially determines that the package A, version 1.0 was distributed in the release 10.0 of the BMC firmware 106. Accordingly, the security vulnerability analyzer 204 queries the package release database 222 to obtain information regarding package A. Upon receiving the query from the security vulnerability analyzer 204, the package release database 222 generates a report 224. The report 224 includes all information regarding package A. In particular, the report 224 includes security vulnerability issues addressed by each version and details of each security vulnerability.

The package release database 222 sends the report 224 to the security vulnerability analyzer 204. From the report 224, the security vulnerability analyzer 204 determines that the package A has updates and the current version is 2.0. Further, the security vulnerability analyzer 204 obtains security vulnerability issues addressed by the version (e.g., the version 1.0) distributed in the BMC firmware 106 and security vulnerability issues addressed by the current version (e.g., the version 2.0). In this example, the report 224 shows that the version 1.0 of the package A addressed security vulnerability issues 1-3, while the version 2.0 of the package A addressed security vulnerability issues 1-10. Based on that information, the security vulnerability analyzer 204 can determine security vulnerability issues existing in the version 1.0 of package A (distributed in the BMC firmware 106) but is addressed by the current version 2.0 of the package A. Those issues are security vulnerability issues 4-10. The security vulnerability analyzer 204 creates a file 262 to identify those security vulnerability issues and to include details of each security vulnerability issue. The security vulnerability analyzer 204 may also retrieve the current version (i.e., the version 2.0) of the package A and store it in the package repository 212. As such, the package repository 212 contains all info regarding the current version of the package A.

The security vulnerability analyzer 204 repeats the procedures described supra for each of the packages 214. As such, the file 262 includes security vulnerability issues that exist in the distributed versions of the packages 214 but can be addressed by the current versions of the packages 214.

In addition, the security vulnerability analyzer 204 quires a security vulnerability database 232 to determine all discovered security vulnerabilities of the package A. The security vulnerability database 232 may contain information of all discovered security vulnerability issues of all packages and details of each security vulnerability issue. Upon receiving the query from the security vulnerability analyzer 204, the package release database 222 generates a report 234. The report 234 includes information of all discovered security vulnerability issues of the package A and details of each security vulnerability. In this example, the report 234 shows that the discovered security vulnerability issues of the package A are security vulnerability issues 1-15.

Subsequently, the security vulnerability analyzer 204 compares the report 234 with the report 224. The comparison result show open security vulnerability issues that have been discovered but have not been addressed by even the current version (i.e., the version 2.0) of the package A. In this example, the open security vulnerability issues are issues 11-15. The security vulnerability analyzer 204 creates a file 264 to identify those open security vulnerability issues and to include details of each security vulnerability issue of the package A.

The security vulnerability analyzer 204 repeats the procedures described supra for each of the packages 214. As such, the file 264 includes open security vulnerability issues of the packages 214 that are not addressed by the current versions of the packages 214.

Figure 3:
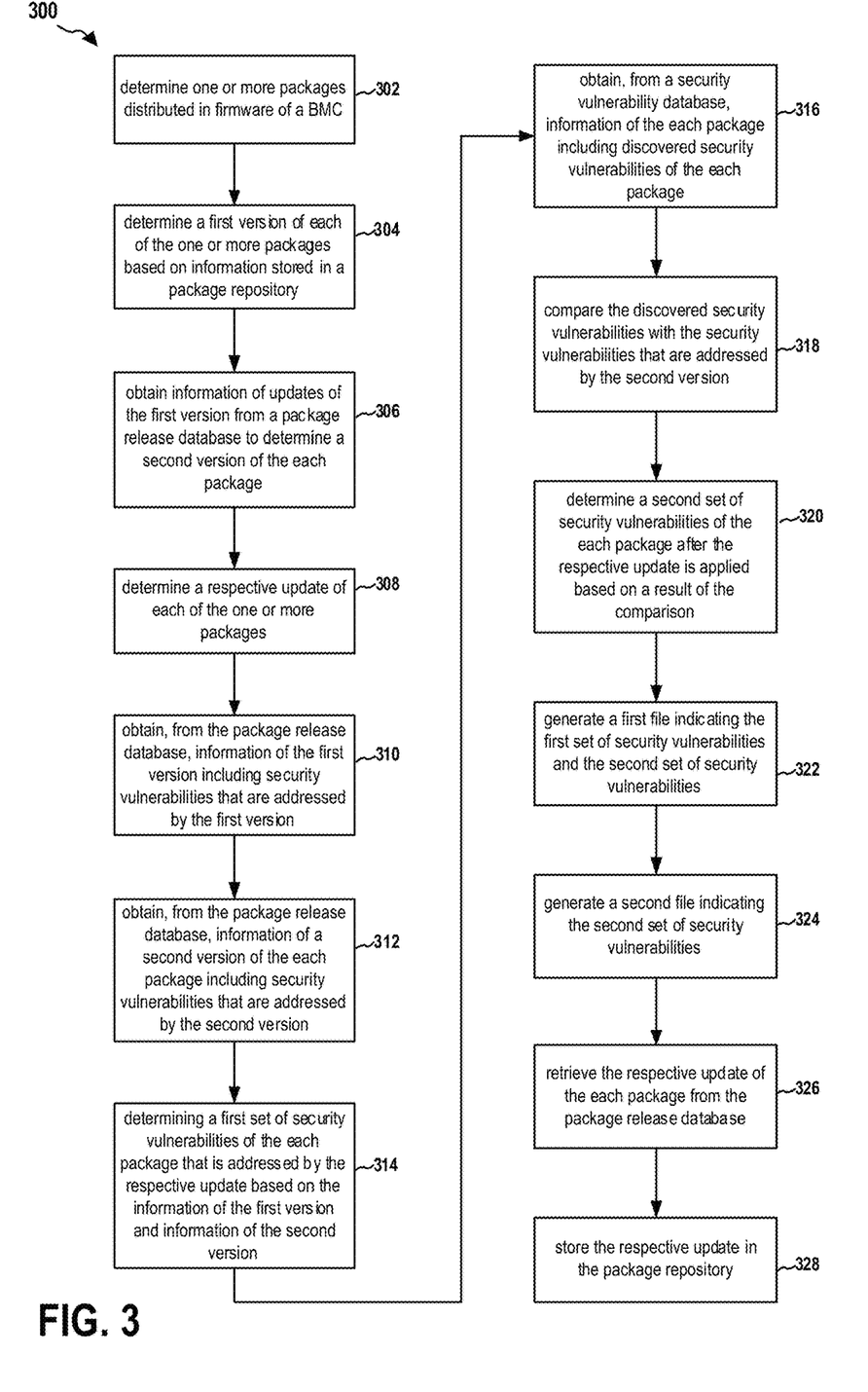
FIG. 3 is a flow chart of a method (process) for determining security vulnerabilities.

FIG. 3 is a flow chart 300 of a method (process) for determining security vulnerabilities. The method may be performed by a device (e.g., the security vulnerability analyzer 204, the apparatus 204'). At operation 302, the device determines one or more packages distributed in firmware of a baseboard management controller (BMC). At operation 304, the device determines a first version of each of the one or more packages based on information stored in a package repository. The respective update of the each package constitutes a second version of the each package. At operation 306, the device obtains information of updates of the first version from a package release database. The second version is determined based on the information of updates.

At operation 308, the device determines a respective update of each of the one or more packages. At operation 310, the device obtains, from the package release database, information of the first version including security vulnerabilities that are addressed by the first version. At operation 312, the device obtains, from the package release database, information of the second version including security vulnerabilities that are addressed by the second version. At operation 314, the device determines a first set of security vulnerabilities of the each package that is addressed by the respective update based on the information of the first version and information of the second version.

At operation 316, the device obtains, from a security vulnerability database, information of the each package including discovered security vulnerabilities of the each package. At operation 318, the device compares the discovered security vulnerabilities with the security vulnerabilities that are addressed by the second version. The second set of security vulnerabilities is determined based on a result of the comparison.

At operation 320, the device determines a second set of security vulnerabilities of the each package after the respective update is applied. At operation 322, the device generates a first file indicating the first set of security vulnerabilities and the second set of security vulnerabilities. At operation 324, the device generates second file indicating the second set of security vulnerabilities.

At operation 326, the device retrieves the respective update of the each package from the package release database. At operation 328, the device stores the respective update in the package repository.

Figure 4:
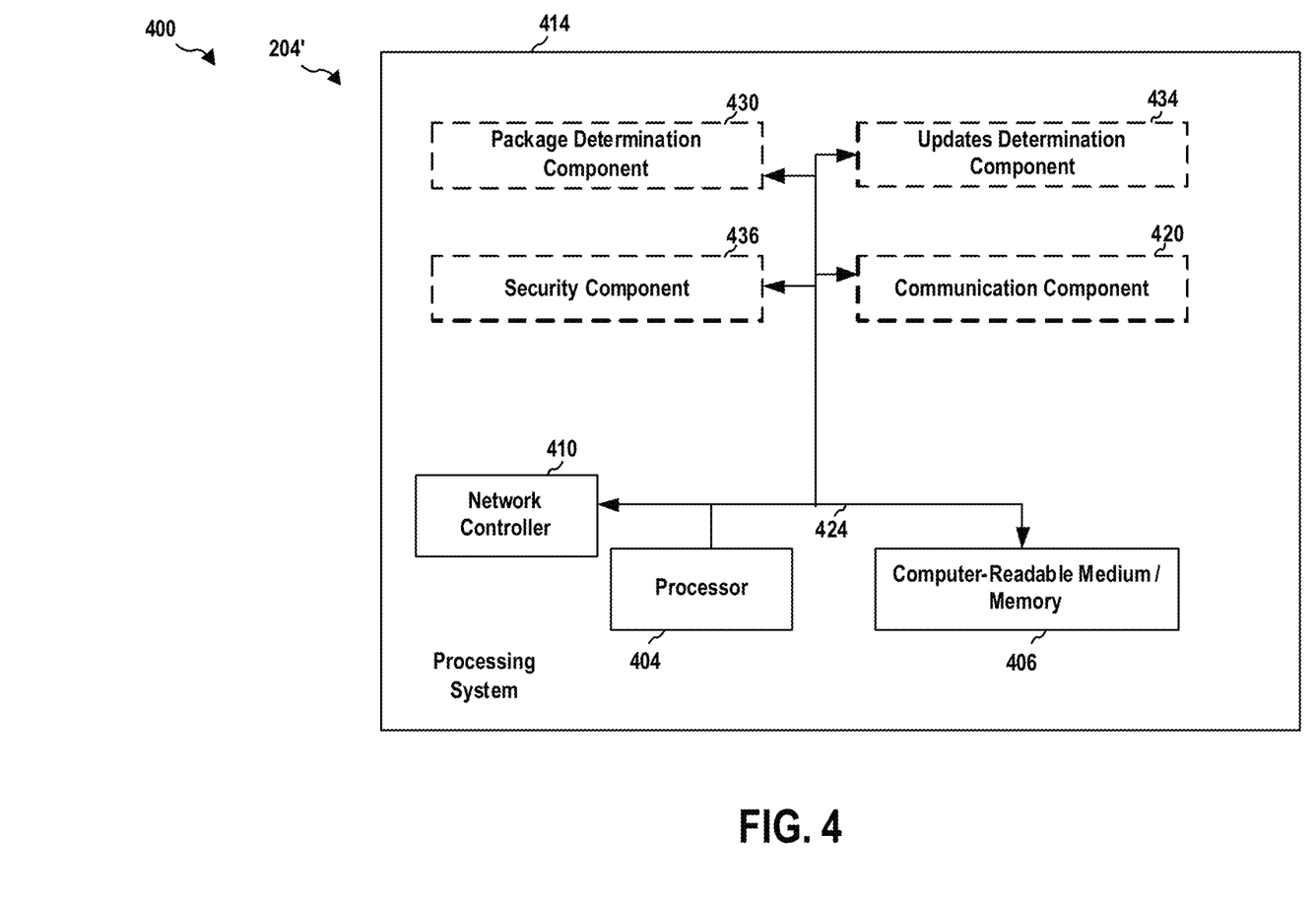
FIG. 4 is a diagram illustrating an example of a hardware implementation for an apparatus employing a processing system.

FIG. 4 is a diagram 400 illustrating an example of a hardware implementation for an apparatus 204' employing a processing system 414. The apparatus 204' may implement the security vulnerability analyzer 204. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc.

The computer-readable medium/memory 406 may include the memory 114 and/or the storage 117. The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 204'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of a package determination component 430, an updates determination component 434, and a security component 436. The components may be software components running in the processor 404, resident/stored in the computer readable medium/memory 406, one or more hardware components coupled to the processor 404, or some combination thereof.

The apparatus 204' may be configured to include means for performing operations described supra referring to FIG. 3. The aforementioned means may be one or more of the aforementioned components of the apparatus 204 and/or the processing system 414 of the apparatus 204' configured to perform the functions recited by the aforementioned means. For example, the package determination component 430 determines one or more packages distributed in firmware of a BMC. The updates determination component 434 determines a respective update of each of the one or more packages. The security component 436 determines a first set of security vulnerabilities of the each package that is addressed by the respective update. The security component 436 further determines a second set of security vulnerabilities of the each package after the respective update is applied. The security component 436 generates a first file indicating the first set of security vulnerabilities and the second set of security vulnerabilities.

Figure 5:
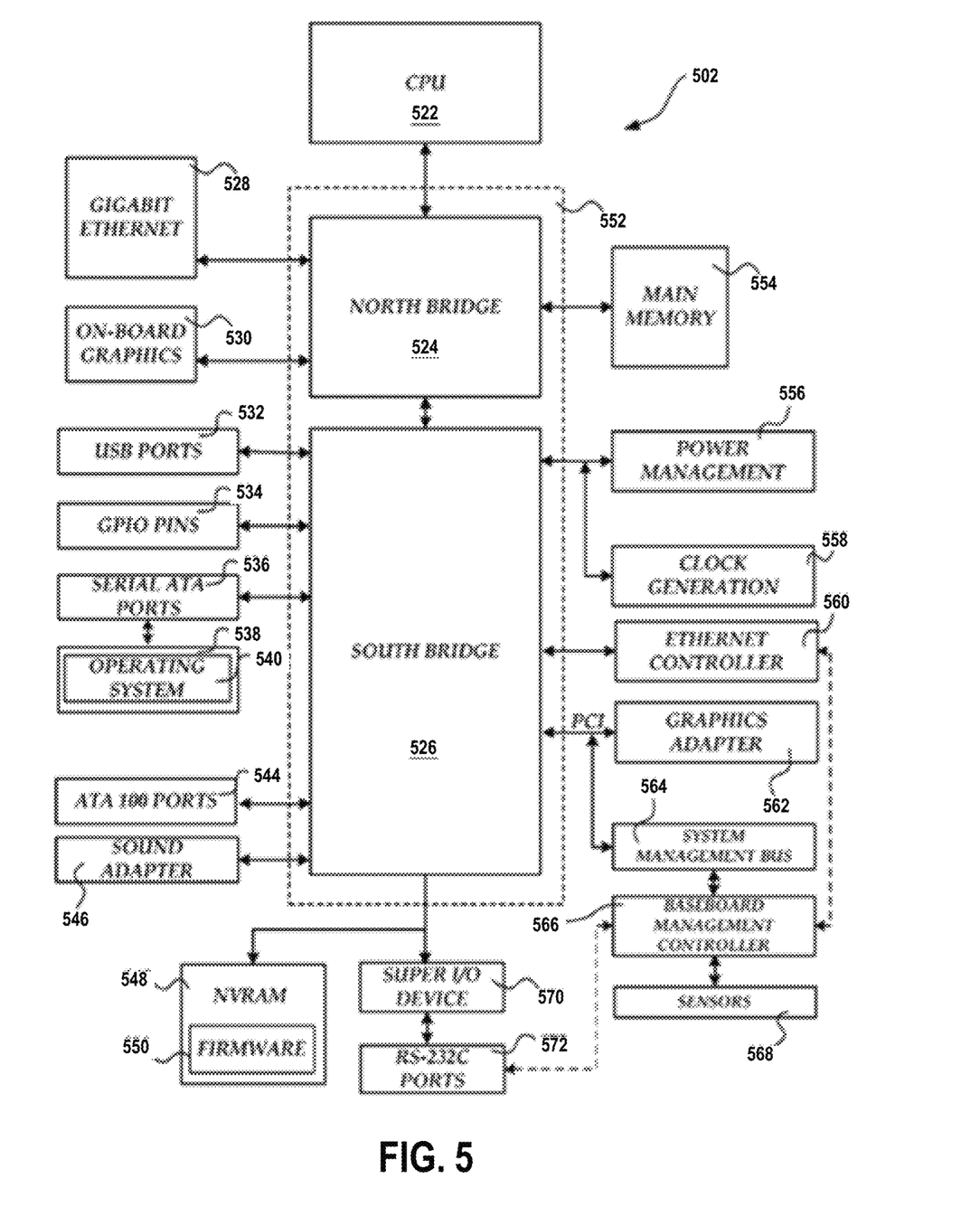
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
   determining two or more packages distributed in firmware of a baseboard management controller (BMC);
   determining a respective update of each of the two or more packages;
   determining a first set of security vulnerabilities of the each package that is addressed by the each package;
   determining a second set of security vulnerabilities of the each package that is addressed by the each package after the respective update is applied;
   generating a first file indicating a difference between the first set of security vulnerabilities and the second set of security vulnerabilities;
   determining a third set of security vulnerabilities of the each package that is discovered security vulnerabilities of the each package; and
   generating a second file indicating a difference between the second set of security vulnerabilities and the third set of security vulnerabilities.

2. The method of claim 1, further comprising:
   determining a first version of the each package based on information stored in a package repository, wherein the respective update of the each package constitutes a second version of the each package.

3. The method of claim 2, further comprising:
   obtaining information of updates of the first version from a package release database, wherein the second version is determined based on the information of updates.

4. The method of claim 3, further comprising:
   obtaining, from the package release database, information of the first version including the first set of security vulnerabilities; and
   obtaining, from the package release database, information of the second version including the second set of security vulnerabilities.

5. The method of claim 4, further comprising:
   obtaining, from a security vulnerability database, information of the each package including the third set of security vulnerabilities of the each package; and
   comparing the third set of security vulnerabilities with the second set of the security vulnerabilities, wherein the difference between the second set of security vulnerabilities and the third set of security vulnerabilities is determined based on a result of the comparison.

6. The method of claim 3, further comprising:
   retrieving the respective update of the each package from the package release database; and
   storing the respective update in the package repository.

7. An apparatus, comprising:
   a memory; and
   at least one processor coupled to the memory and configured to:
     determine two or more packages distributed in firmware of a baseboard management controller (BMC);
     determine a respective update of each of the two or more packages;
     determine a first set of security vulnerabilities of the each package that is addressed by the each package;
     determine a second set of security vulnerabilities of the each package that is addressed by the each package after the respective update is applied;
   generate a first file indicating a difference between the first set of security vulnerabilities and the second set of security vulnerabilities;
   determine a third set of security vulnerabilities of the each package that is discovered security vulnerabilities of the each package; and
   generate a second file indicating a difference between the second set of security vulnerabilities and the third set of security vulnerabilities.

8. The apparatus of claim 7, wherein the at least one processor is further configured to:
  determine a first version of the each package based on information stored in a package repository, wherein the respective update of the each package constitutes a second version of the each package.

9. The apparatus of claim 8, wherein the at least one processor is further configured to:
  obtain information of updates of the first version from a package release database, wherein the second version is determined based on the information of updates.

10. The apparatus of claim 9, wherein the at least one processor is further configured to:
  obtain, from the package release database, information of the first version including the first set of security vulnerabilities; and
  obtain, from the package release database, information of the second version including the second set of security vulnerabilities.

11. The apparatus of claim 10, wherein the at least one processor is further configured to:
  obtain, from a security vulnerability database, information of the each package including the third set of security vulnerabilities of the each package; and
  compare the third set of security vulnerabilities with the second set of the security vulnerabilities, wherein the difference between the second set of security vulnerabilities and the third set of security vulnerabilities is determined based on a result of the comparison.

12. The apparatus of claim 9, wherein the at least one processor is further configured to:
  retrieve the respective update of the each package from the package release database; and
  store the respective update in the package repository.

13. A non-transitory computer-readable medium storing computer executable code for operating a testing platform, comprising code to:
  determine two or more packages distributed in firmware of a baseboard management controller (BMC);
  determine a respective update of each of the two or more packages;
  determine a first set of security vulnerabilities of the each package that is addressed by the each package;
  determine a second set of security vulnerabilities of the each package that is addressed by the each package after the respective update is applied;
  generate a first file indicating a difference between the first set of security vulnerabilities and the second set of security vulnerabilities;
  determine a third set of security vulnerabilities of the each package that is discovered security vulnerabilities of the each package; and
  generate a second file indicating a difference between the second set of security vulnerabilities and the third set of security vulnerabilities.

14. The non-transitory computer-readable medium of claim 13, wherein the code is further configured to:
  determine a first version of the each package based on information stored in a package repository, wherein the respective update of the each package constitutes a second version of the each package.

15. The non-transitory computer-readable medium of claim 14, wherein the code is further configured to:
  obtain information of updates of the first version from a package release database, wherein the second version is determined based on the information of updates.

16. The non-transitory computer-readable medium of claim 15, wherein the code is further configured to:
  obtain, from the package release database, information of the first version including the first set of security vulnerabilities; and
  obtain, from the package release database, information of the second version including the second set of security vulnerabilities.

17. The non-transitory computer-readable medium of claim 16, wherein the code is further configured to:
  obtain, from a security vulnerability database, information of the each package including the third set of security vulnerabilities of the each package; and
  compare the third set of security vulnerabilities with the second set of the security vulnerabilities, wherein the difference between the second set of security vulnerabilities and the third set of security vulnerabilities is determined based on a result of the comparison.

* * * * *